UNITED STATES PATENT OFFICE.

GEORGES BOSSIÈRE, OF PARIS, FRANCE.

IMPROVEMENT IN DECOLORIZING TANNIN LIQUIDS.

Specification forming part of Letters Patent No. 81,587, dated September 1, 1868.

*To all whom it may concern:*

Be it known that I, GEORGES BOSSIÈRE, of Paris, in the Empire of France, have invented certain new and useful Improvements in Decolorizing Tannin-Juices; and I do hereby declare the following to be a full, clear, and exact description of the same.

The object of my invention is to decolorize tannin-juices, so as to render them fit for tanning calf-skins, and, in general, all kinds of hides.

This process of decoloration is applicable to all tanning materials, to extracts of American tannin, to gums of all kinds, to the bark and roots of *Quercus coccifera*, (*chêne-kermès*,) and, in general, to all substances producing a red and highly-colored tannin.

In order to effect this decoloration, it is necessary, in tanning, to take the scraps or clippings cut from the skin during its treatment, free them from lime, and dissolve them by means of heat, (either by fire directly or steam,) at a temperature of from 100° to 150° centigrade, more or less, in such a quantity of water that the solution, after cooling, will remain liquid, and at the same time clear; for example, about sixty kilograms of this glue or mucilage obtained from the refuse clippings or scraps may be mixed with one hundred and fifty kilograms of water.

By mixing more or less of this liquid with the material to be decolorized, (which should itself be in a liquid state,) the latter will be proportionately decolorized—that is to say, it will lose its red color, and become fit for tanning.

The following proportions for the mixture are given by way of example: sixty kilograms of fresh glue or mucilage, prepared as above stated, to one hundred kilograms of colored juice.

This decoloration of tannin-juices can be effected by means of all gelatine-glues, by dissolving them, in the proportion of one kilogram of glue to fifteen to twenty liters of water. They possess the advantage over glues made from scraps and shavings, as above described, of producing a more limpid and at the same time more effective decolorizing liquid.

Acetate of lead dissolved in acidulated water, and also kaolin (without any other matter) decolorize tannin-juices, being precipitated in the liquid to be decolorized. For instance, one kilogram of acetate of lead, dissolved in two hundred and fifty grams of acidulated water, will decolorize twenty-five kilograms of juice; ten kilograms of kaolin will decolorize twenty-five kilograms of colored tannin.

By the foregoing process, the tanning matter will be decolorized, but not precipitated; and it is in this that the principal advantage of my invention consists.

What I claim, and desire to secure by Letters Patent, is—

1. The use of the herein-named substance for decolorizing tannin-juices, substantially in the manner described.

2. The method of decolorizing tannin by mixing with it the ingredients herein named, or either of them, in the proportions substantially as specified.

In testimony whereof I have signed my name to this specification in the presence of two subscribing witnesses.

G. BOSSIÈRE.

Witnesses:
C. LAFOND,
F. OLCOTT.